US011550180B2

(12) United States Patent
Huang et al.

(10) Patent No.: US 11,550,180 B2
(45) Date of Patent: Jan. 10, 2023

(54) DISPLAY DEVICES AND METHOD FOR MANUFACTURING THE SAME

(71) Applicant: InnoLux Corporation, Miao-Li County (TW)

(72) Inventors: Yu-Chia Huang, Miao-Li County (TW); Yuan-Lin Wu, Miao-Li County (TW); Chandra Lius, Miao-Li County (TW); Kuan-Feng Lee, Miao-Li County (TW); Tsung-Han Tsai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/400,786

(22) Filed: Aug. 12, 2021

(65) Prior Publication Data
US 2021/0373373 A1 Dec. 2, 2021

Related U.S. Application Data

(63) Continuation of application No. 16/360,546, filed on Mar. 21, 2019, now abandoned.

(51) Int. Cl.
G02F 1/1368 (2006.01)
G02F 1/1335 (2006.01)
(Continued)

(52) U.S. Cl.
CPC .... *G02F 1/13338* (2013.01); *G02F 1/133305* (2013.01); *G02F 1/133723* (2013.01);
(Continued)

(58) Field of Classification Search
CPC ............... G02F 1/1333; G02F 1/13338; G02F 1/133305; G02F 1/1362; G02F 1/136277;
(Continued)

(56) References Cited

U.S. PATENT DOCUMENTS 10,048,795 B2    8/2018  Lee et al.
2015/0137127 A1* 5/2015  Hwang ............... H01L 29/786
                                                257/66
2016/0098140 A1* 4/2016  Lee .................... G06V 40/1306
                                                345/173

FOREIGN PATENT DOCUMENTS

CN          205068352 U       3/2016

OTHER PUBLICATIONS

Chinese language office action dated Nov. 3, 2022, issued in application No. CN 202010099316.6.

* cited by examiner

Primary Examiner — Thoi V Duong
(74) Attorney, Agent, or Firm — McClure, Qualey & Rodack, LLP

(57) ABSTRACT

A liquid crystal display is provided. The liquid crystal display includes a first substrate. The liquid crystal display also includes a plurality of first thin film transistors disposed on the first substrate. The liquid crystal display further includes a second substrate disposed opposite to the first substrate. In addition, the liquid crystal display includes a plurality of second thin film transistors disposed on the second substrate. The liquid crystal display also includes a plurality of sensing units disposed on the second substrate, and at least one of the plurality of sensing units electrically connected to at least one of the plurality of second thin film transistors. The liquid crystal display further includes a liquid crystal layer disposed between the first substrate and the second substrate.

10 Claims, 15 Drawing Sheets

(51) Int. Cl.
*G02F 1/1333* (2006.01)
*G02F 1/1362* (2006.01)
*G02F 1/1337* (2006.01)

(52) U.S. Cl.
CPC .. *G02F 1/136209* (2013.01); *G02F 1/136277* (2013.01); *G02F 1/136222* (2021.01)

(58) Field of Classification Search
CPC ............ G02F 1/136222; G02F 1/1368; G02F 1/133723; G06F 3/0412
See application file for complete search history.

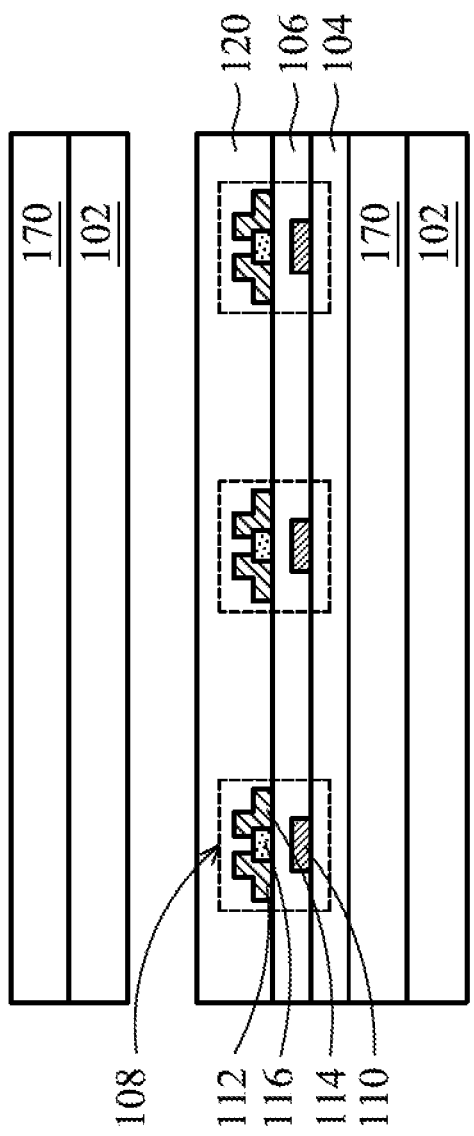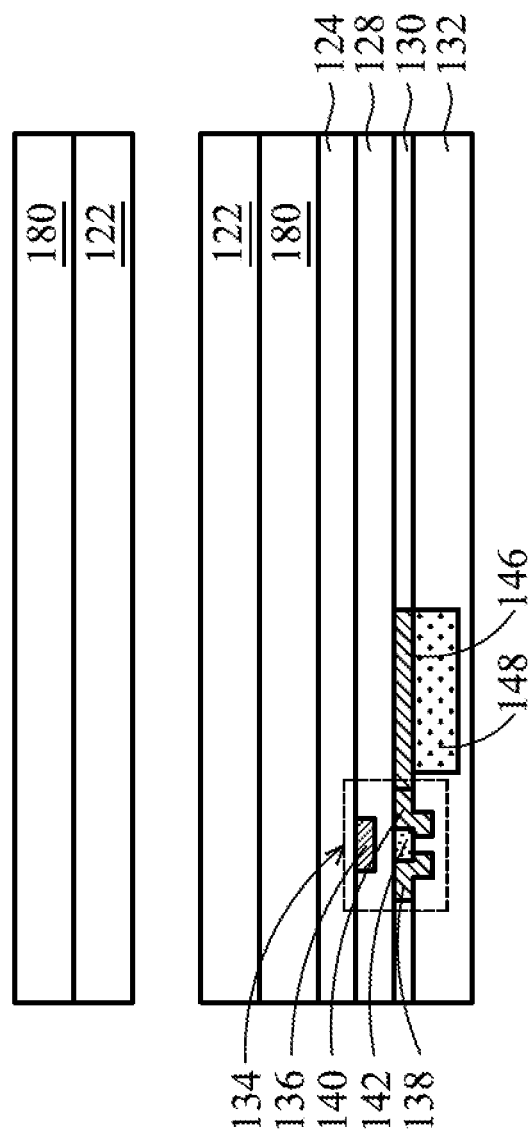

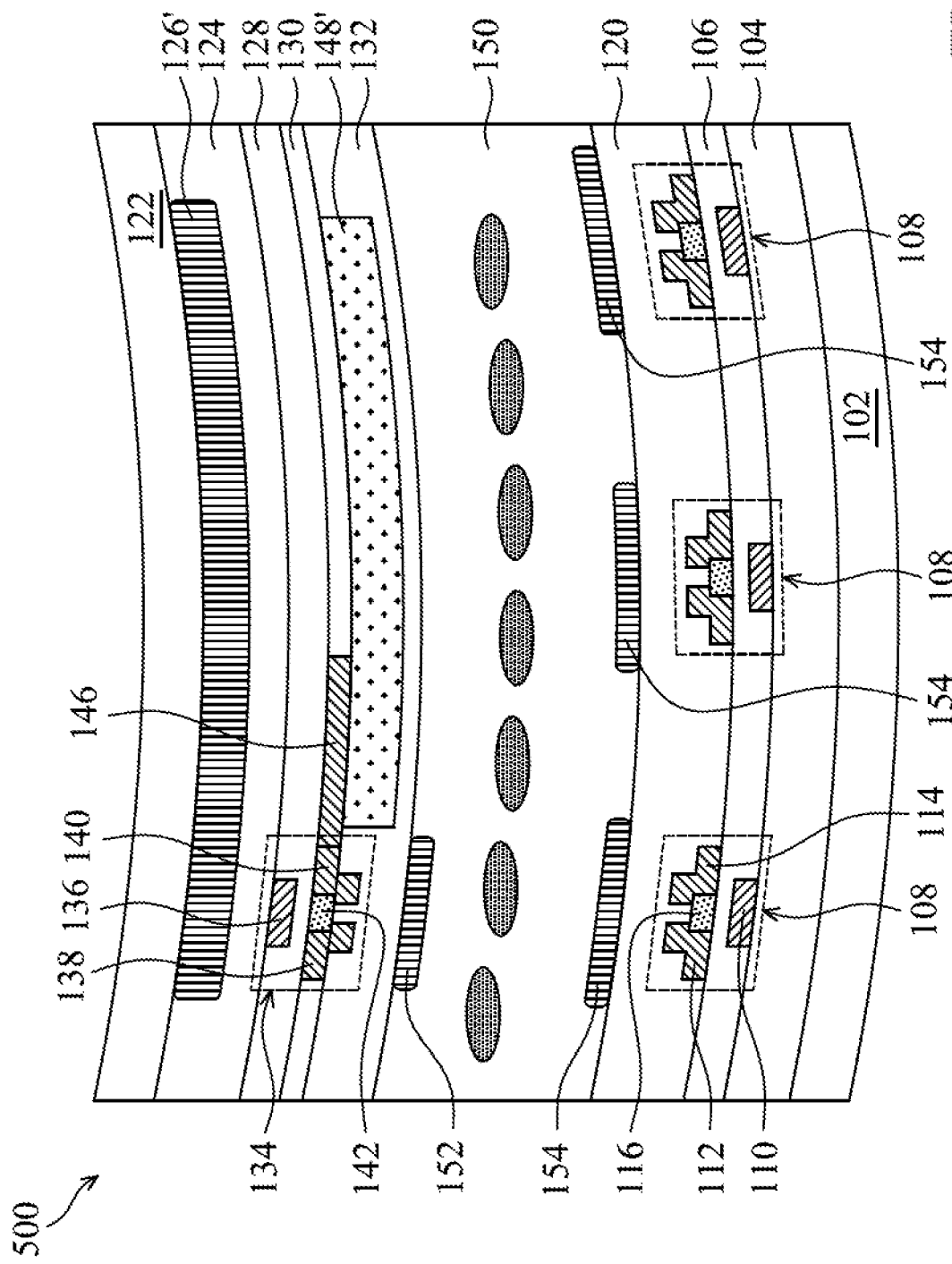

DISPLAY DEVICES AND METHOD FOR MANUFACTURING THE SAME

CROSS REFERENCE TO RELATED APPLICATIONS

This application is a Continuation of pending U.S. patent application Ser. No. 16/360,546, filed on Mar. 21, 2019 and entitled "LIQUID CRYSTAL DISPLAYS AND METHODS FOR MANUFACTURING THE SAME", now abandoned, the entirety of which is incorporated by reference herein.

BACKGROUND

Technical Field

The present disclosure relates to a liquid crystal display, and in particular to a liquid crystal display that includes a counter substrate with thin film transistors thereon.

Description of the Related Art

Liquid crystal displays that include a display panel, such as smartphones, tablets, notebooks, monitors, and TVs, have become indispensable necessities in modern society. With the flourishing development of such portable electronic products, consumers have high expectations regarding the quality, functionality, and price of such products. These electronic products are often provided with communications capabilities. Specifically, a liquid crystal display can control the rotation direction of the liquid crystal molecules for displaying.

However, some difficulties may be encountered through the use of liquid crystal displays. Accordingly, a new liquid crystal display that improves display quality is needed.

SUMMARY

In accordance with some embodiments of the present disclosure, a liquid crystal display is provided. The liquid crystal display includes a first substrate. The liquid crystal display also includes a plurality of first thin film transistors disposed on the first substrate. The liquid crystal display further includes a second substrate disposed opposite the first substrate. In addition, the liquid crystal display includes a plurality of second thin film transistors disposed on the second substrate. The liquid crystal display also includes a plurality of sensing units disposed on the second substrate, and at least one of the plurality of sensing units electrically connected to at least one of the plurality of second thin film transistors. The liquid crystal display further includes a liquid crystal layer disposed between the first substrate and the second substrate.

In accordance with some embodiments of the present disclosure, a method for manufacturing a liquid crystal display is provided. The method includes providing a first substrate. The method also includes forming a plurality of first thin film transistors on the first substrate. The method further includes providing a second substrate. In addition, the method includes forming a plurality of second thin film transistors on the second substrate. The method also includes forming a plurality of sensing units on the second substrate, and at least one of the plurality of sensing units electrically connected to at least one of the plurality of second thin film transistors. The method further includes combining the first substrate and the second substrate through a liquid crystal layer.

A detailed description is given in the following embodiments with reference to the accompanying drawings.

BRIEF DESCRIPTION OF THE DRAWINGS

The disclosure may be understood by reading the subsequent detailed description and examples with references made to the accompanying drawings, wherein:

FIGS. 10A-10E illustrate cross-sectional views of different stages of a process for manufacturing the liquid crystal display in accordance with some embodiments of the present disclosure.

FIG. 12 illustrates a cross-sectional view of the liquid crystal display in accordance with some embodiments of the present disclosure.

DETAILED DESCRIPTION

Figure 1:
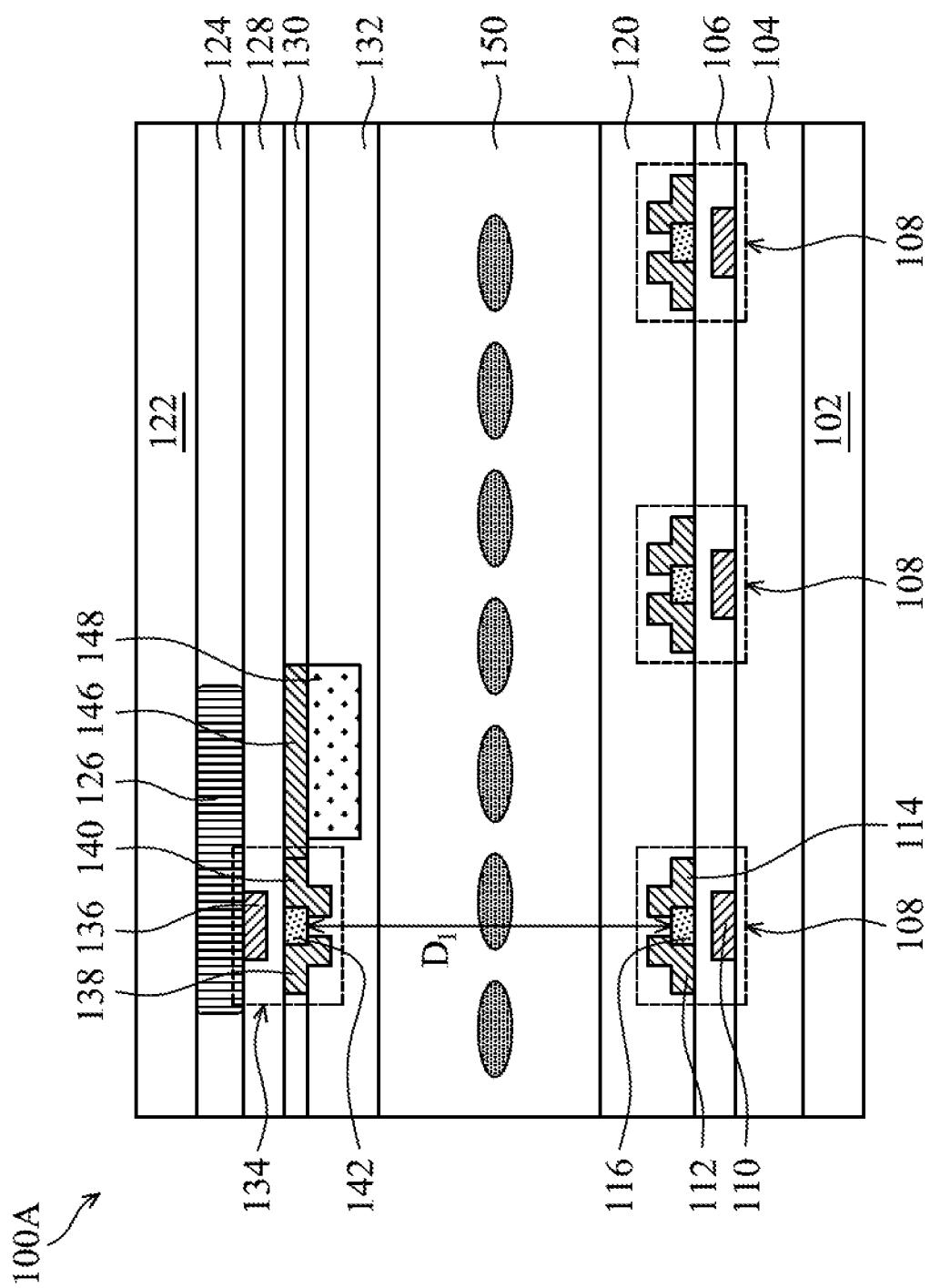
FIG. 1 illustrates a cross-sectional view of the liquid crystal display in accordance with some embodiments of the present disclosure.

The liquid crystal display of the present disclosure and the manufacturing method thereof are described in detail in the following description. In the following detailed description, for purposes of explanation, numerous specific details and embodiments are set forth in order to provide a thorough understanding of the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements. However, the use of like and/or corresponding numerals in the drawings of different embodiments does not suggest any correlation between different embodiments. In addition, in this specification, expressions such as "first material layer disposed above/on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

In addition, in this specification, relative expressions are used. For example, "upper" or "lower" is used to describe the position of one element relative to another. It should be appreciated that if a device is flipped upside down, an element that is on the "bottom" will become an element that is on the "top".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing. In the drawings, some components may be omitted for clarity. Moreover, some components in the drawings may be eliminated as another embodiment of the present disclosure.

The terms "about" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially". Moreover, when considering the deviation or the fluctuation of the manufacturing process, the term "same" may also include the meaning of "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

In addition, the phrase "in a range from a first value to a second value" indicates the range includes the first value, the second value, and other values in between.

In addition, the term "cover" includes the meaning of "cover partially" or "cover completely".

Refer to FIG. 1, which illustrates a cross-sectional view of a liquid crystal display 100A in accordance with some embodiments of the present disclosure. The liquid crystal display 100A may include a first substrate 102. The first substrate 102 may include a glass substrate, a ceramic substrate, a polymer substrate, other suitable substrates, or a combination thereof. A buffer layer 104 may be disposed on the first substrate 102. The buffer layer 104 may include multiple layers with different materials. A gate dielectric layer 106 may be disposed on the buffer layer 104. The material of the gate dielectric layer 106 may include, but is not limited to, silicon oxide (SiOx), silicon nitride (SiNy), high dielectric constant (high-k) dielectric material or other suitable dielectric materials.

As shown in FIG. 1, the liquid crystal display 100A may include a plurality of first thin film transistors 108. The first thin film transistor 108 may include a gate electrode 110, a source 112, a drain 114 and a semiconductor layer 116. The gate electrode 110 may be disposed on the buffer layer 104. In some examples, the thin film transistors in the present disclosure may include a top gate thin film transistor, a bottom gate thin film transistor, a dual gate thin film transistor, a double gate thin film transistor, other suitable transistors, or a combination thereof.

The material of the gate electrode 110 may include metal, such as copper (Cu), aluminum (Al), molybdenum (Mo), tungsten (W), gold (Au), chromium (Cr), nickel (Ni), platinum (Pt), titanium (Ti).

The source 112, the drain 114 and the semiconductor layer 116 may be disposed on the gate dielectric layer 106. In some embodiments, the material of the semiconductor layer 116 of the first thin film transistor 108 may include, but is not limited to, amorphous silicon, polysilicon such as low-temp polysilicon (LTPS), metal oxide or other suitable materials. The metal oxide may include indium gallium zinc oxide (IGZO), indium zinc oxide (IZO), indium gallium zinc tin oxide (IGZTO), low temperature polycrystalline oxide (LTPO), other suitable materials, or a combination thereof. In some embodiments, the material of the source 112 and the drain 114 may include metal, such as copper (Cu), aluminum (Al), molybdenum (Mo), tungsten (W), gold (Au), chromium (Cr), nickel (Ni), platinum (Pt), titanium (Ti).

As shown in FIG. 1, the liquid crystal display 100 may include pads or contacts (not shown) that are electrically connected to the source 112 and/or the drain 114. The pads or the contacts may be used to electrically connect the first thin film transistor 108 to other electronic elements (not shown). The liquid crystal display 100 may include a dielectric layer 120 disposed on the gate dielectric layer 106. The material of the dielectric layer 120 may include phosphosilicate glass (PSG), borophosphosilicate glass (BPSG), low dielectric constant (low-k) material and/or other suitable material(s). The low dielectric constant dielectric materials may include, but are not limited to, fluorinated silica glass (FSG), silicon oxide, silicon nitride, amorphous fluorinated carbon, parylene, bis-benzocyclobutenes (BCB), polyimides, or other suitable materials. Though it is not depicted, some metal wires or through holes may be formed in the dielectric layer 120.

As shown in FIG. 1, the liquid crystal display 100 may include a second substrate 122 that is disposed opposite to the first substrate 102. The second substrate 122 may include a glass substrate, a ceramic substrate, a polymer substrate, other suitable substrates, or a combination thereof. A buffer layer 124 may be disposed on the second substrate 122. The buffer layer 124 may include multiple layers with different materials. A shielding layer 126 may be disposed on the second substrate 122 and/or in the buffer layer 124. In some embodiments, the shielding layer 126 may be a light shielding layer that allows specific wavelength of light or a portion of light to pass through. It should be appreciated that although FIG. 1 illustrates the gate electrode 136 is in directly contact with the shielding layer 126, some additional layers may be disposed between the gate electrode 136 and the shielding layer 126.

A gate dielectric layer 128 is disposed on the buffer layer 124. The material of the gate dielectric layer 128 may be the same as or similar to the gate dielectric layer 106, and thus it is not repeated herein. A dielectric layer 130 and a dielectric layer 132 may be disposed on the gate dielectric layer 128. The dielectric layers 130 and 132 may include, but is not limited to, PSG, BPSG, FSG, silicon oxide, silicon nitride, amorphous fluorinated carbon, parylene, BCB, polyimides, or other suitable materials. Though it is not depicted, some metal wires or through holes may be formed in the dielectric layer 130 and/or dielectric layer 132.

As shown in FIG. 1, the liquid crystal display 100A may include a second thin film transistor 134. It should be appreciated that FIG. 1 illustrates only one second thin film transistor 134. However, the liquid crystal display 100A may include more second thin film transistors 134 in other cross sections. The second thin film transistor 134 may include a gate electrode 136, a source 138, a drain 140 and a semiconductor layer 142. The material of the gate electrode 136 may include metal, such as copper (Cu), aluminum (Al), molybdenum (Mo), tungsten (W), gold (Au), chromium (Cr), nickel (Ni), platinum (Pt), titanium (Ti).

The source 138, the drain 140 and the semiconductor layer 142 may be disposed on the gate dielectric layer 128. In some embodiments, the material of the semiconductor layer 142 of the second thin film transistor 134 may include, but is not limited to, amorphous silicon, polysilicon such as low-temp polysilicon (LTPS), metal oxide or other suitable materials. The metal oxide may include indium gallium zinc oxide (IGZO), indium zinc oxide (IZO), indium gallium zinc tin oxide (IGZTO), low temperature polycrystalline oxide (LTPO), other suitable materials, or a combination thereof. In some embodiments, the material of the source 138 and the drain 140 may include metal.

In the embodiment where the semiconductor layer is the indium gallium zinc oxide (IGZO) layer, the semiconductor layer may include different compositions of In, Ga, and Zn, such as 1:1:1:4 or other suitable composition(s). In some embodiments, the material of the semiconductor layer of the first thin film transistor 108 is different from that of the second thin film transistor 134. For example, the material of the semiconductor layer of the first thin film transistor 108 may include low-temp polysilicon, while the material of the semiconductor layer of the second thin film transistor 134 may include IGZO. In other examples, the material of the semiconductor layer of the first thin film transistor 108 may include amorphous silicon, while the material of the semiconductor layer of the second thin film transistor 134 may include low-temp polysilicon.

In some embodiments, the semiconductor layers 116 and 142 respectively include a channel. The width and/or the length of the channel of the semiconductor layer 116 and the channel of the semiconductor layer 142 may be different. In some embodiments, the width-to-length ratios of the channel of the semiconductor layer 116 and the channel of the semiconductor layer 142 may be different.

In some embodiments, the distance $D_1$ between the first thin film transistor 108 and the second thin film transistor 134 is in a range from about 0.5 µm to about 10 µm. More specifically, the distance $D_1$ between the first thin film transistor 108 and the second thin film transistor 134 may refer to a minimum distance between two semiconductor layers of the first thin film transistor 108 and the second thin film transistor 134 along a direction that is parallel to the normal of the first substrate 102. For example, the distance $D_1$ between the semiconductor layer 116 and the semiconductor layer 142 is in a range of about 0.5 µm and about 10 µm. If the distance $D_1$ between the first thin film transistor 108 and the second thin film transistor 134 is within the range mentioned above, it may decrease the signal interference between the first thin film transistor 108 and the second thin film transistor 134.

In some embodiments, the shielding layer 126 may overlap with the semiconductor layer 142 of the second thin film transistor 134. In some examples, the shielding layer 126 may overlap with the channel of the second thin film transistor 134. The shielding layer 126 may be configured to reduce at least a portion of the light affecting the second thin film transistor 134, but it is not limited thereto. The term "overlap" may include partially overlap or entirely overlap in the normal direction of the second substrate 122. More specifically, the projection of the shielding layer 126 on the second substrate 122 may overlap with the projection of the semiconductor layer of the second thin film transistor 134 on the second substrate 122.

As shown in FIG. 1, the liquid crystal display 100A may include pads or contacts (not shown) electrically connected to the source 138 and the drain 140. The pads or the contacts may be used to electrically connect the second thin film transistor 134 to other electronic elements (not shown). The liquid crystal display 100A may further include an electrode 146 that electrically connect the second thin film transistor 134 to a sensing unit 148. The material of the pad 144 and the electrode 146 may include metal. Though it is not depicted, two or more second thin film transistors 134 and sensing units 148 may be disposed on the second substrate 122. The number of second thin film transistors 134 and the number of sensing units 148 are not limited in the present disclosure. In some embodiments, at least one of the plurality of sensing units 148 may be electrically connected to at least one of the plurality of second thin film transistors 134. In one example, one sensing units 148 may be electrically connected to two or more second thin film transistors 134. In other examples, two or more sensing units 148 may be electrically connected to two or more second thin film transistors 134. In another example, two or more sensing units 148 may be electrically connected to one second thin film transistors 134. The numbers are not limited in the present disclosure.

The sensing unit 148 may be used to sense a photonic signal and convert it into an electrical signal, but it is not limited thereto. In some examples, the sensing unit 148 may be a touch sensing unit, a fingerprint sensing unit, a proximity sensing unit, or any other suitable sensing unit. Although FIG. 1 illustrates only one sensing unit 148, the liquid crystal display 100A may include more sensing units 148, and the scope of the disclosure is not intended to be limited. In some embodiments, the sensing unit 148 may include a photoactive layer disposed between two semiconductor layers. In addition, these two semiconductor layers may be doped with dopants of different types. For example, one of the semiconductor layers may include n-type dopants, and another one of the semiconductor layers may include p-type dopants. In some embodiments, the concentration of the dopants of the photoactive layer may be less than the concentrations of the dopants of the semiconductor layers. In some embodiments, the sensing unit 148 may be, but is not limited to, a PIN diode.

As shown in FIG. 1, the liquid crystal display 100A may include a liquid crystal layer 150 disposed between the second substrate 122 and the first substrate 102. Though it is not depicted, a pixel electrode, a common electrode and alignment layers are disposed on the first substrate 102 and/or the second substrate 122. The alignment of the liquid crystal layer 150 may be controlled.

Since some thin film transistors, such as the second thin film transistors 134, are disposed on the second substrate 122, the space on the second substrate 122 may be used in a more efficient way. As a result, there are fewer thin film transistors occupying space over the first substrate 102, thereby reducing the size of the liquid crystal display 100A.

Figure 2:
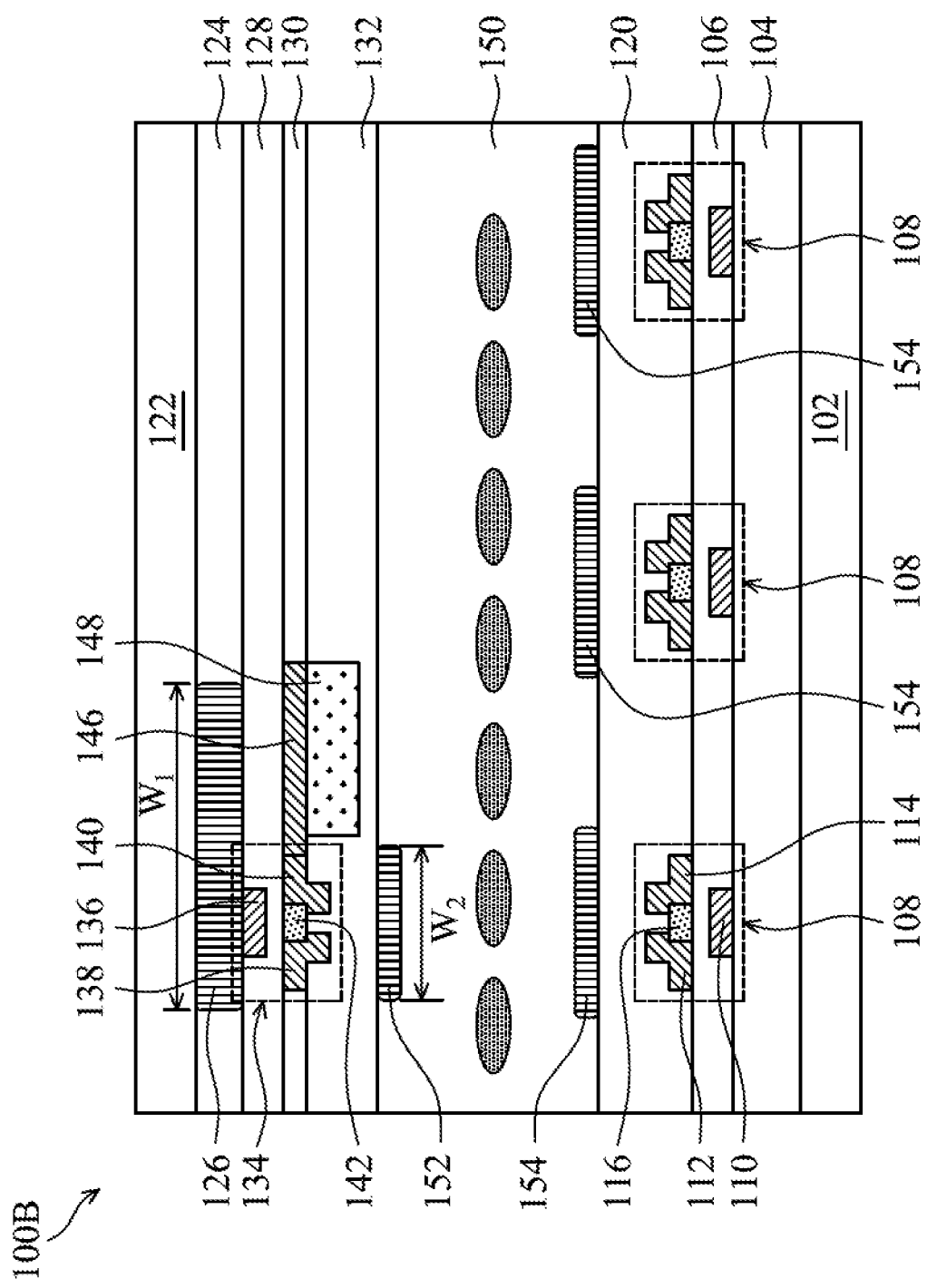
FIG. 2 illustrates a cross-sectional view of the liquid crystal display in accordance with some embodiments of the present disclosure.

Many variations and/or modifications can be made to embodiments of the disclosure. Refer to FIG. 2, which illustrates a cross-sectional view of a liquid crystal display 100B in accordance with some embodiments of the present disclosure. In some embodiments, one of the differences between the liquid crystal display 100A and the liquid crystal display 100B is that the liquid crystal display 100B may further include a shielding layer 152 and/or a shielding layer 154. It should be appreciated that the shielding layer 126, the shielding layer 152 and/or the shielding layer 154 can shield light with specific wavelength, such as visible light, infrared light (IR) or ultraviolet light (UV). In another example, the shielding layer 126, the shielding layer 152 and/or the shielding layer 154 may include metal material for shielding electric field, or include black resin for absorbing light.

As shown in FIG. 2, the shielding layer 152 may be disposed between the second thin film transistor 134 and the liquid crystal layer 150. In some embodiments, the shielding layer 152 may overlap with the semiconductor layer 142 of the second thin film transistor 134. Therefore, light may be incident to the sensing unit 148 without being incident to the second thin film transistor 134, and the second thin film transistor 134 may not be affected by the light. In some embodiments, the shielding layer 152 may include a material that can absorb IR or can shield electric field. In some embodiments, the width $W_1$ of the shielding layer 126 may be greater than the width $W_2$ of the shielding layer 152. The widths of the shielding layers may be measured along a direction perpendicular to the normal direction of the second substrate 122 in a cross-sectional view. In some embodiments, the material of the shielding layer 126 may be different from the material of the shielding layer 152.

As shown in FIG. 2, the shielding layer 154 may be disposed on the first thin film transistor 108. In some embodiments, the shielding layer 154 may overlap with the semiconductor layer 116 of the first thin film transistor 108. Therefore, light may be incident to the sensing unit 148 without being incident to the first thin film transistor 108, and the first thin film transistor 108 would not be affected by the light.

Figure 3:
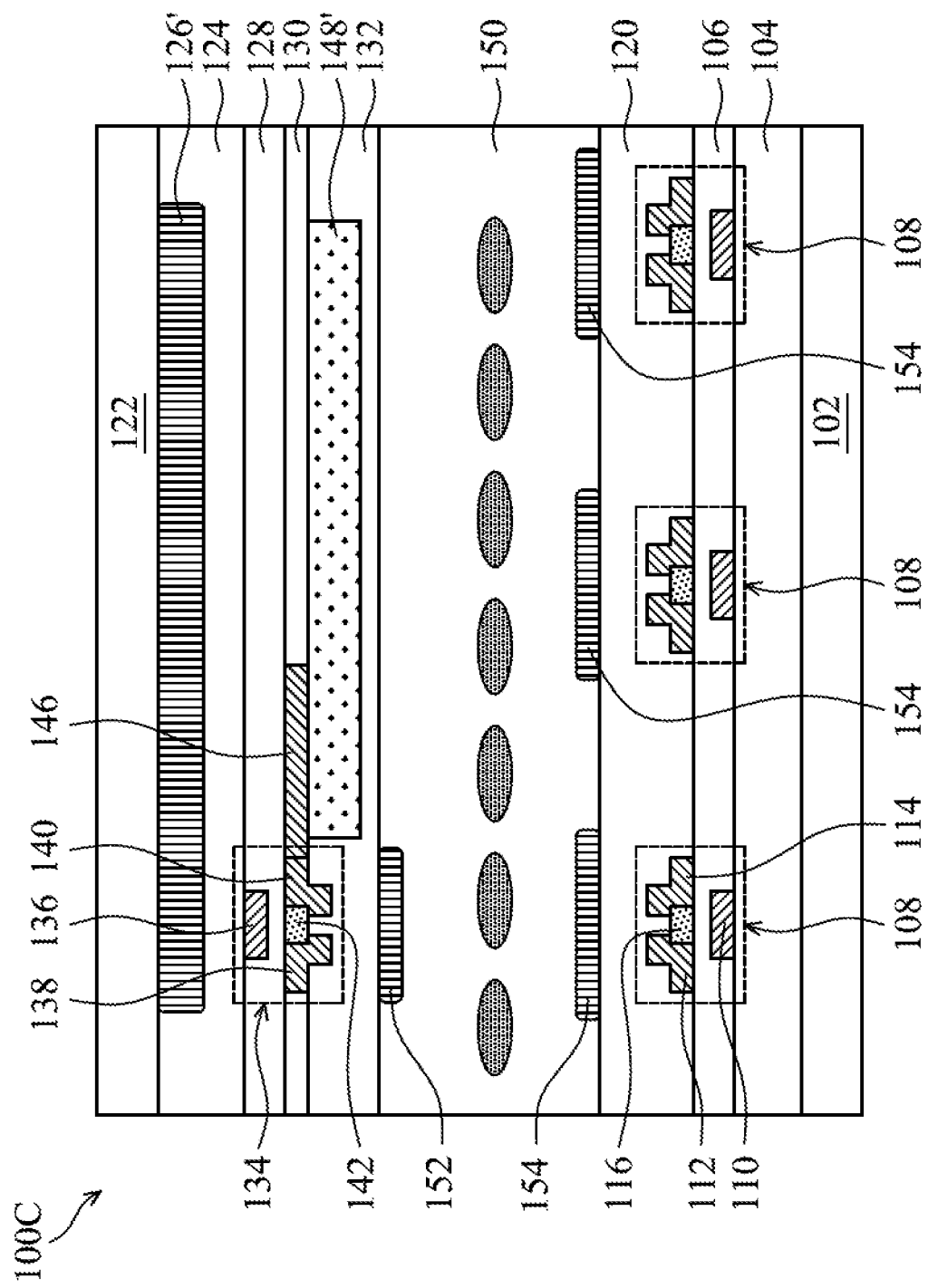
FIG. 3 illustrates a cross-sectional view of the liquid crystal display in accordance with some embodiments of the present disclosure.

Many variations and/or modifications can be made to embodiments of the disclosure. Refer to FIG. 3, which illustrates a cross-sectional view of a liquid crystal display 100C in accordance with some embodiments of the present disclosure. In some embodiments, one of the differences between the liquid crystal display 100B and the liquid crystal display 100C is that the liquid crystal display 100C may include a shielding layer 126' and a sensing unit 148' replacing the shielding layer 126 and the sensing unit 148, respectively.

As shown in FIG. 3, the sensing unit 148' may extend across two or more first thin film transistors 108. More specifically, the sensing unit 148' may overlap with the semiconductor layers of two or more first thin film transistors 108. In addition, the shielding layer 126' may overlap with the sensing unit 148'. Namely, the projection of the shielding layer 126' on the second substrate 122 may overlap with the projection of the sensing unit 148' on the second substrate 122.

Figure 4A:
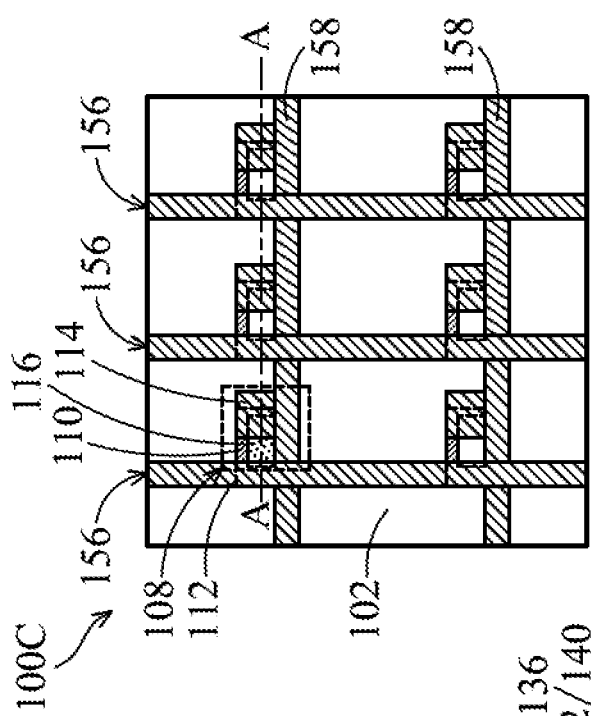
FIGS. 4A-4C illustrate top views of the liquid crystal display shown in FIG. 3.

Referring to FIG. 4A, which illustrates a top view of the liquid crystal display 100C. It should be appreciated that some elements are omitted in FIG. 4A for clearly presenting the layout of the first thin film transistor 108. More specifically, line A-A shown in FIG. 4A is a cross-sectional line, which presents a cross-sectional view of FIG. 3. As shown in FIG. 4A, the liquid crystal display 100C may include a data line 156 and a gate line 158, which may be substantially perpendicular to the data line 156. The data line 156 may be electrically connected to the source 112 of the first thin film transistor 108. The gate line 158 may be electrically connected to the gate electrode 110 of the first thin film transistor 108. The materials of the data line 156 and the gate line 158 may include metal, such as such as copper (Cu), aluminum (Al), molybdenum (Mo), tungsten (W), gold (Au), chromium (Cr), nickel (Ni), platinum (Pt), titanium (Ti). As shown in FIG. 4A, the data line 156 and the gate line 158 may define a plurality of pixels or sub-pixels of the liquid crystal display 100C.

Figure 4C:
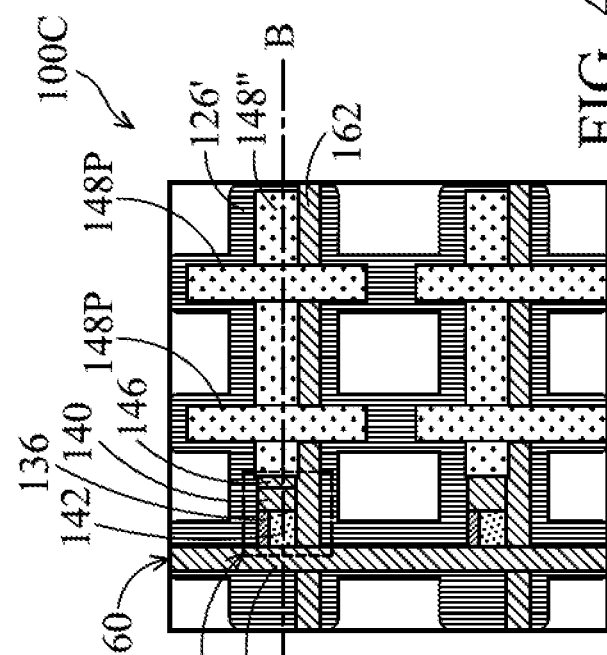
Figure 4B:
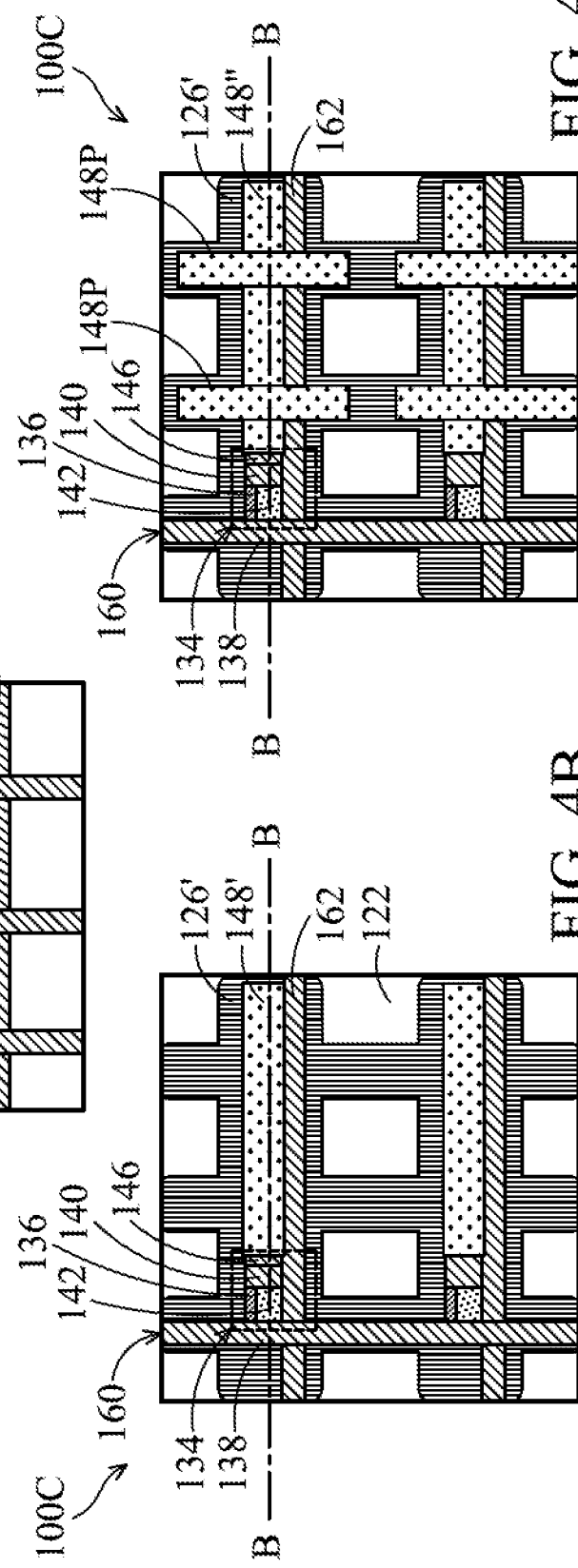

Referring to FIG. 4B, which illustrates a top view of the liquid crystal display 100C. It should be appreciated that some elements are omitted in FIG. 4B for clearly presenting the layout of the second thin film transistor 134, the sensing unit 148' and the shielding layer 126'. More specifically, line B-B shown in FIG. 4B is a cross-sectional line, which presents a cross-sectional view of FIG. 3. As shown in FIG. 4B, the liquid crystal display 100C may include a data line 160 and a gate line 162. The data line 160 may be electrically connected to the source 138 of the second thin film transistor 134. The gate line 162 may be electrically connected to the gate electrode 136 of the second thin film transistor 134. The materials of the data line 160 and the gate line 162 may include metal.

As shown in FIGS. 4A and 4B, the shielding layer 126' may define a plurality of openings and allow light to pass through the openings. The shielding layer 126' may overlap with the data line 160 and the gate line 162 as well as the data line 156 and the gate line 158. The sensing unit 148' may overlap with two or more first thin film transistors 108. The sensing unit 148' may extend in a direction that is parallel to the extending direction of the gate line 162. Since the sensing unit 148' has a surface area greater than the surface area of the sensing unit 148, the sensing unit 148' may receive more light, thereby improving the sensitivity of the liquid crystal display 100C.

Many variations and/or modifications can be made to embodiments of the disclosure. Refer to FIG. 4C, which illustrates a cross-sectional view of a liquid crystal display 100C in accordance with some embodiments of the present disclosure. In some embodiments, the sensing unit 148" may include at least one protruding portion 148P that extends in a direction substantially parallel to the extending direction of with the data line 160. In addition, as shown in FIG. 4C, the shielding layer 126' may overlap with the at least one protruding portion 148P. In this embodiment, the sensing unit 148" has at least one protruding portion 148P, and the sensing unit 148' would have greater surface area, thereby improving the sensitivity of the liquid crystal display 100C.

Figure 5:
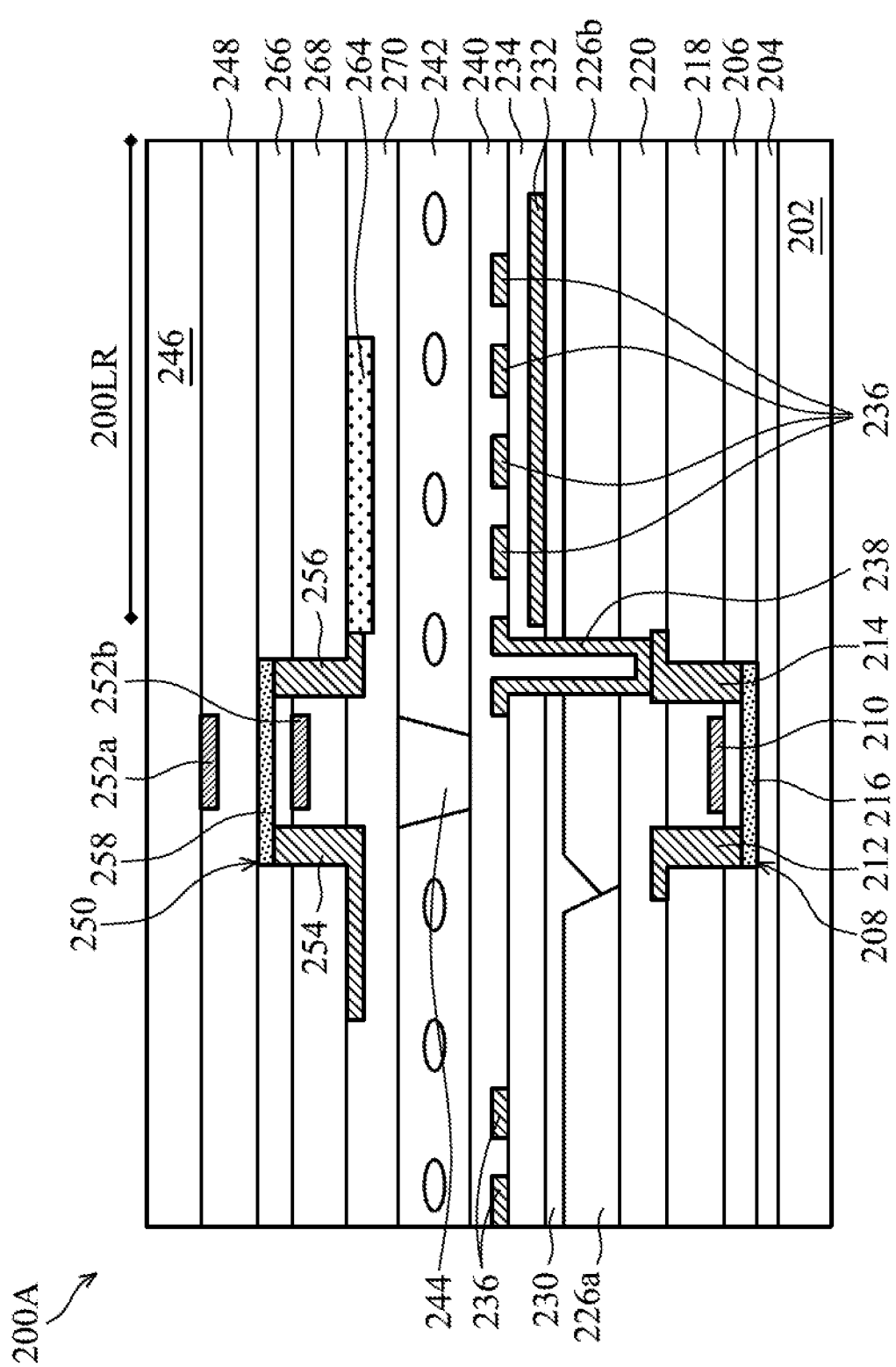
FIG. 5 illustrates a cross-sectional view of the liquid crystal display in accordance with some embodiments of the present disclosure.

Referring to FIG. 5, which illustrates a cross-sectional view of a liquid crystal display 200A in accordance with some embodiments of the present disclosure. The liquid crystal display 200A includes a first substrate 202. The first substrate 202 may be the same as or similar to the first substrate 102. The liquid crystal display 200A may include a buffer layer 204 and a gate dielectric layer 206 that may be the same as or similar to the buffer layer 104 and the gate dielectric layer 106, respectively. The liquid crystal display 200A may include a first thin film transistor 208. The first thin film transistor 208 may include a gate electrode 210, a source 212, a drain 214 and a semiconductor layer 216 that may be the same as or similar to the gate electrode 110, the source 112, the drain 114 and the semiconductor layer 116, respectively. In some examples, the semiconductor layer may include a doped region and an un-doped region. Though it is not depicted, two or more first thin film transistors 208 may be disposed on the first substrate 202, and the number of first thin film transistors 208 is not limited in the present disclosure. The liquid crystal display 200A may include a dielectric layer 218 and a passivation layer 220. The material of the dielectric layer 218 and the passivation layer 220 may include dielectric materials such as PSG, BPSG, FSG, silicon oxide, silicon nitride, amorphous fluorinated carbon, parylene, BCB, polyimides, or other suitable materials. As shown in FIG. 5, the liquid crystal display 200A may include a color filter layer 226a and a color filter layer 226b disposed on the passivation layer 220. The color filter layer 226a and the color filter layer 226b may allow light with specific wavelength to pass through. For example, the color filter layer 226a and the color filter layer 226b may include, but are not limited to, a red color filter layer, a green color filter layer, a blue color filter layer or an IR color filter layer. The liquid crystal display 200A may include a planarization layer 230. The material of the planarization layer 230 may be the same as or similar to that of the passivation layer 220. In some examples, the liquid crystal display 200A may include a curved liquid crystal display or a flexible liquid crystal display. The color filter layer 226a and the color filter layer 226b disposed on the first substrate 202 may reduce the light leakage caused by bending the liquid crystal display.

As shown in FIG. 5, the liquid crystal display 200A may include a pixel electrode 232, a dielectric layer 234 and a common electrode 236. The pixel electrode 232 is disposed on the planarization layer 230, and the common electrode 236 is disposed on the dielectric layer 234. In other examples, the pixel electrode 232 may be disposed on the common electrode 236, or the pixel electrode 232 and the common electrode 236 may be disposed on the same layer, but the present disclosure is not limited thereto. The voltage difference between the pixel electrode 232 and the common electrode 236 may be controlled by the first thin film transistor 208 through a conductive through hole 238. The conductive through hole 238 may penetrate the planarization layer 230 and the color filter layer 226b. FIG. 5 illustrates that the common electrode 236 is patterned, and the common electrode 236 would have discrete portions. Many variations and/or modifications can be made to embodiments of the disclosure. In some embodiments, the common electrode 236 is not patterned. The material of the pixel electrode 232, the common electrode 236 and the conductive through hole 238 may include a metal, a transparent conductive material (e.g. indium tin oxide), or a combination thereof.

The liquid crystal display 200A may include an alignment layer 240. The alignment layer 240 may be used to control the alignment of the liquid crystal layer 242. The material of the alignment layer 240 may include, but is not limited to, polyimide (PI). As shown in FIG. 5, the liquid crystal display 200A may include a spacer 244 disposed between the first substrate 202 and a second substrate 246. In some embodiments, the material of the spacer 244 may include, but is not limited to, polyethylene terephthalate (PET), polyethylene (PE), polyethersulfone (PES), polycarbonate (PC), polymethylmethacrylate (PMMA), glass, any other suitable materials, or a combination thereof.

As shown in FIG. 5, the liquid crystal display 200A may include the second substrate 246 that may be the same as or similar to the second substrate 122. The liquid crystal display 200A may include a gate dielectric layer 248 that may be the same as or similar to the gate dielectric layer 128. The liquid crystal display 200A may include a second thin film transistor 250. The second thin film transistor 250 may include a gate electrode 252a, a gate electrode 252b, a source 254, a drain 256 and a semiconductor layer 258. In this embodiment, the second thin film transistor 250 include a double gate thin film transistor that has two gate electrodes disposed on two opposite sides of the semiconductor layer of the second thin film transistor 250. In other examples, the second thin film transistor 250 may include a top gate thin film transistor, a bottom gate thin film transistor, or a dual gate thin film transistor. In some embodiments, the gate electrode 252b may be optionally formed.

The source 254, the drain 256 and the semiconductor layer 258 may be the same as or similar to the source 138, the drain 140 and the semiconductor layer 142, respectively. In some embodiments, the material(s) of the source 254 and the drain 256 may include metal. The liquid crystal display 200A may include a sensing unit 264 that may be the same as or similar to the sensing unit 148. As shown in FIG. 5, the second thin film transistor 250 is electrically connected to the sensing unit 264. Though it is not depicted, two or more second thin film transistors 250 and sensing units 264 may be disposed on the second substrate 246. The number of second thin film transistors 250 and the number of sensing units 264 are not limited in the present disclosure. The liquid crystal display 200A further includes a dielectric layer 266, a dielectric layer 268. The materials of the dielectric layer 266 and the dielectric layer 268 may include the dielectric materials mentioned above.

The liquid crystal display 200A may include an alignment layer 270. As shown in FIG. 5, the alignment layer 240 and the alignment layer 270 may be disposed on two opposite sides of the liquid crystal layer 242 and configured to control the alignment of the liquid crystal layer 242. The material of the alignment layer 270 may include, but is not limited to, polyimide. The liquid crystal display 200A may include a liquid-emitting region 200LR that may be defined as, but is not limited to, a region overlapping with the pixel electrode 232.

In this embodiment, the gate electrode 252a may be used as a shielding layer, and light affecting the semiconductor of the second thin film transistor 250 may be reduce. Moreover, the color filter layers may be disposed on the first substrate 202 but not on the second substrate 246. Since some of the thin film transistors, such as the second thin film transistors 250, are disposed on the second substrate 246, there is an additional space that could be used to dispose the color filter layers. Therefore, the space on the first substrate 202 may be used in a more efficient way. Besides, when the liquid crystal display 200A is a curved liquid crystal display, the color filter layers disposed on the first substrate 202 may reduce the color shift caused by the mis-alignment between the pixels and the color filter layers.

Figure 6:
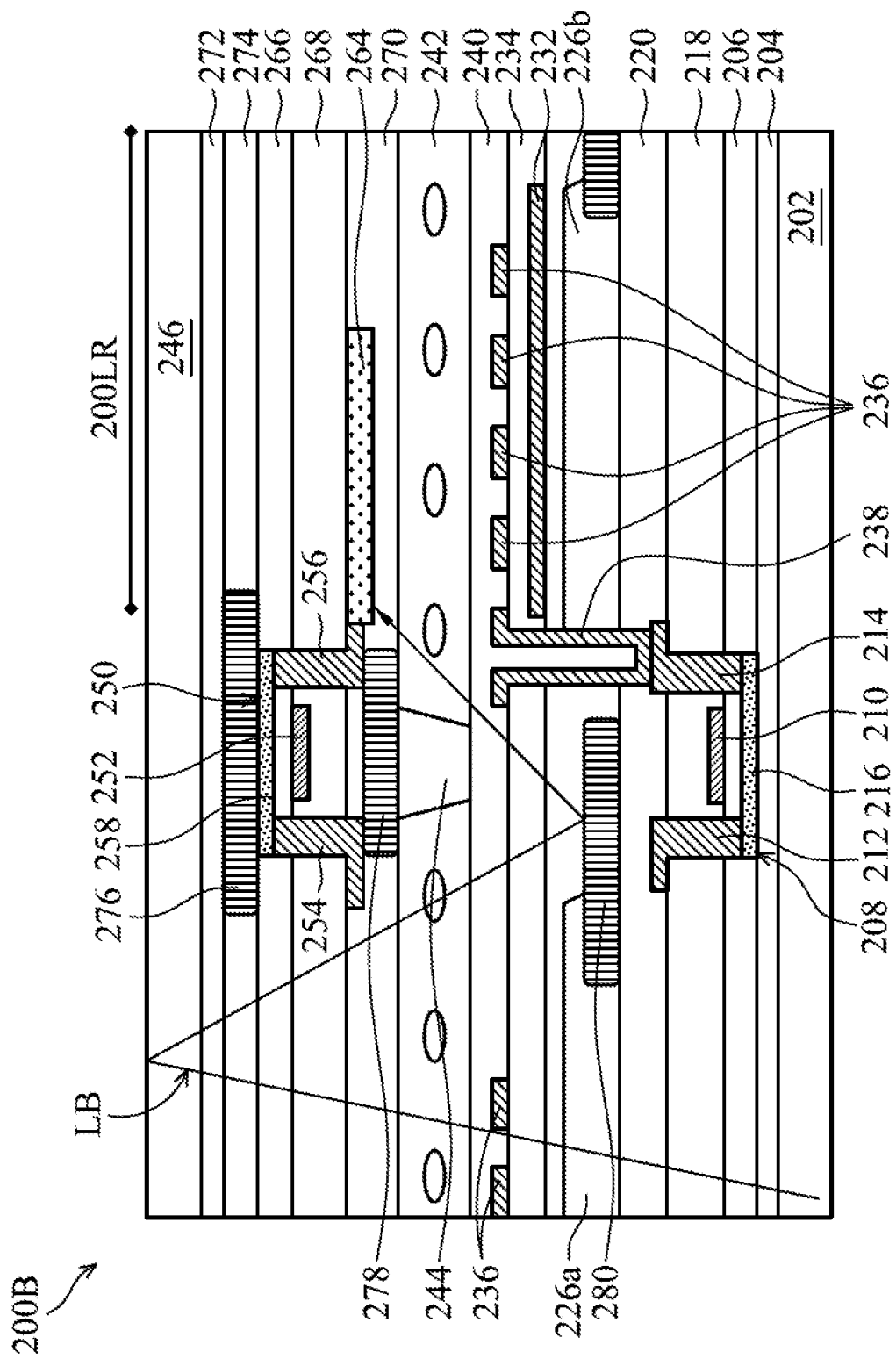
FIG. 6 illustrates a cross-sectional view of the liquid crystal display in accordance with some embodiments of the present disclosure.

Many variations and/or modifications can be made to embodiments of the disclosure. Refer to FIG. 6, which illustrates a cross-sectional view of a liquid crystal display 200B in accordance with some embodiments of the present disclosure. In some embodiments, one of the differences between the liquid crystal display 200A and the liquid crystal display 200B is that the liquid crystal display 200B may further include buffer layers 272 and 274 disposed on the second substrate 246. The buffer layers 272 and 274 may be the same as or similar to the buffer layer 124. Moreover, the liquid crystal display 200B may include a shielding layer 276, a shielding layer 278 and a shielding layer 280. It should be appreciated that the shielding layer 276, the shielding layer 278 and/or the shielding layer 280 can shield a portion of light including visible light or light with specific wavelength, such as infrared light (IR) or ultraviolet light (UV). In another example, the shielding layer 276, the shielding layer 278 and/or the shielding layer 280 include a metal material for shielding electric field. In addition, in this embodiment, the liquid crystal display 200B may include the second thin film transistor 250 with a single gate electrode, such as a gate electrode 252. In the case where the material(s) of the shielding layer 276, the shielding layer 278 and/or the shielding layer 280 include conductive material such as metal, the shielding layer 276, the shielding layer 278 and/or the shielding layer 280 may not be in contact with other conductive and/or semi-conductive components, such as the conductive through hole 238.

In some embodiments, the shielding layer 276 may be disposed between the second substrate 246 and the second thin film transistor 250. As shown in FIG. 6, the shielding layer 276 overlaps with the semiconductor layer 258 of the second thin film transistor 250. The shielding layer 278 may be disposed between the second thin film transistor 250 and the liquid crystal layer 242. In some embodiments, the shielding layer 278 overlaps with the semiconductor layer 258 of the second thin film transistor 250.

The shielding layer 280 may be disposed between the first thin film transistor 208 and the liquid crystal layer 242. In some embodiments, the shielding layer 280 overlaps with the semiconductor layer 216 of the first thin film transistor 208. Moreover, at least a portion of the shielding layer 280 may be disposed between the color filter layer 226a and the color filter layer 226b.

As shown in FIG. 6, the light beam LB from a light source may be incident to the sensing unit 264 while reducing the possibility of affecting the first thin film transistor 208 and the second thin film transistor 250. In some embodiments, at least one of the shielding layer 276, the shielding layer 278 and the shielding layer 280 may be optionally formed according to the requirement of design. For example, the shielding layer 278 and the shielding layer 280 may not be formed in some embodiments.

In some embodiments, the materials of the shielding layer 276, the shielding layer 278 and/or the shielding layer 280 may be different. For example, the shielding layer 280 may include metal material to reflect the light from the light source. The shielding layer 276 and/or the shielding layer 278 may include a light-absorbing material to decrease the reflectance of the second thin film transistor 250.

Figure 7:
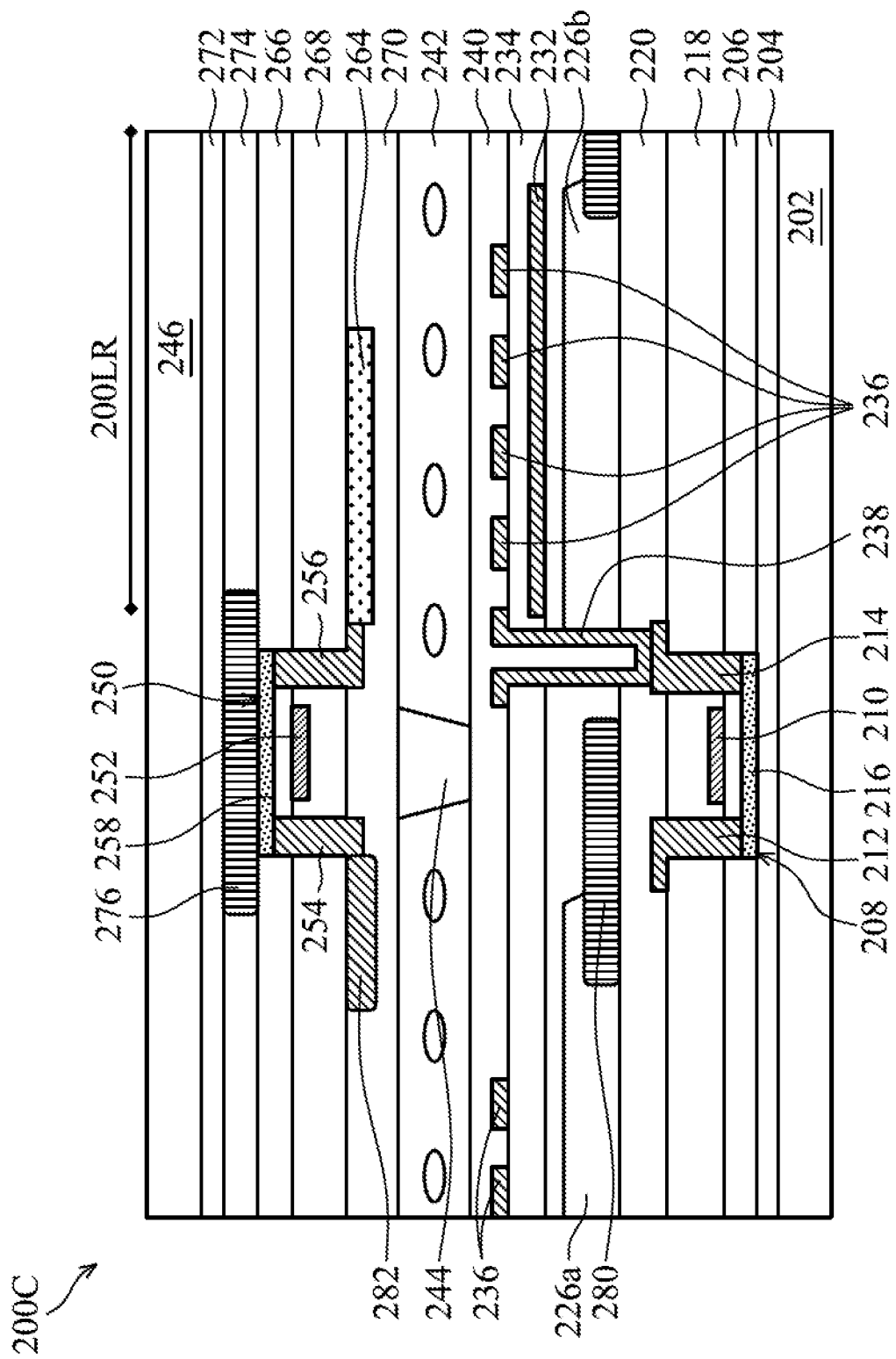
FIG. 7 illustrates a cross-sectional view of the liquid crystal display in accordance with some embodiments of the present disclosure.

Many variations and/or modifications can be made to embodiments of the disclosure. Refer to FIG. 7, which illustrates a cross-sectional view of a liquid crystal display 200C in accordance with some embodiments of the present disclosure. In some embodiments, one of the differences between the liquid crystal display 200B and the liquid crystal display 200C is that the liquid crystal display 200C may include a shielding layer 282. In some embodiments, the shielding layer 282 may not overlap with the semiconductor layer 258 of the second thin film transistor 250. In some embodiment, the shielding layer 282 may include an extending portion of the source 254. That is, the source 254 may include an extending portion disposed on the 268 as a shielding layer. Because of the shielding layer 282 and the spacer 244, light from a light source may be incident to the sensing unit 264 while reducing the possibility of affecting the second thin film transistor 250.

Figure 8:
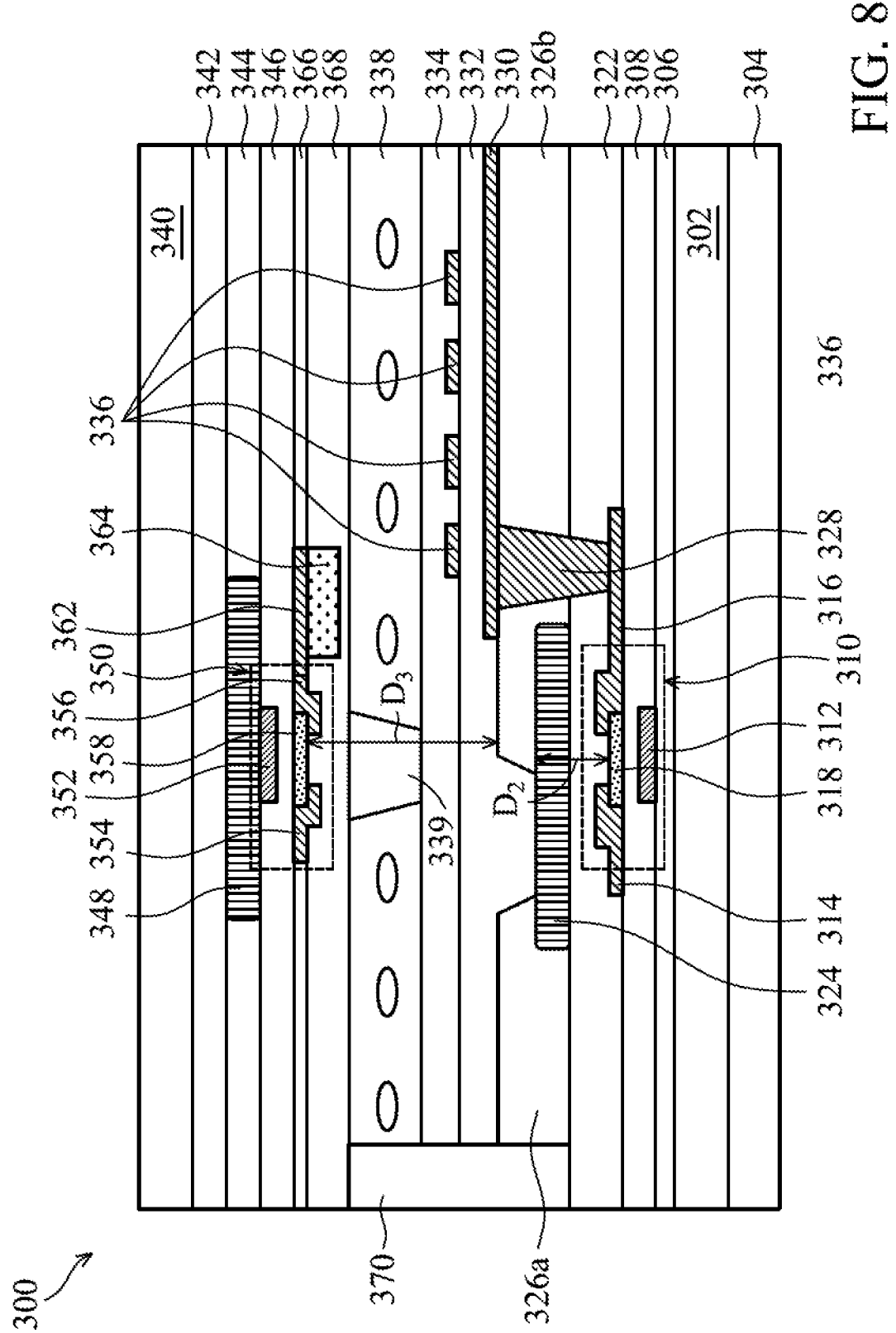
FIG. 8 illustrates a cross-sectional view of the liquid crystal display in accordance with some embodiments of the present disclosure.

Referring to FIG. 8, which illustrates a cross-sectional view of a liquid crystal display 300 in accordance with some embodiments of the present disclosure. The liquid crystal display 300 includes a first substrate 302. The first substrate 302 may be the same as or similar to the first substrate 102. The liquid crystal display 300 may include a backlight module 304. The backlight module 304 may include at least one light source. For example, the backlight module 304 may include a plurality of light-emitting diodes (LED), organic light-emitting diodes (OLED). The light-emitting diodes may be a micro LED or a mini LED. The backlight module 304 may include, but is not limited to, direct type backlight module or edge-lit type backlight module. Some additional layers may be disposed between the first substrate 302 and the backlight module 304, such as a polarizer, but it is not limited thereto.

The liquid crystal display 300 may include a buffer layer 306 and a gate dielectric layer 308 that may be the same as or similar to the buffer layer 104 and the gate dielectric layer 106, respectively. The liquid crystal display 300 may include a first thin film transistor 310. The first thin film transistor 310 may include a gate electrode 312, a source 314, a drain 316 and a semiconductor layer 318 that may be the same as or similar to the gate electrode 110, the source 112, the drain 114 and the semiconductor layer 116, respectively. Though it is not depicted, two or more first thin film transistors 310 may be disposed on the first substrate 302, and the number of first thin film transistors 310 is not limited in the present disclosure. The liquid crystal display 300 may include a dielectric layer 322. The material of the dielectric layer 322 may include the dielectric material(s) mentioned above.

As shown in FIG. 8, the liquid crystal display 300 may include a shielding layer 324 on the dielectric layer 322. The shielding layer 324 may be the same as or similar to the shielding layer 154. The liquid crystal display 300 may include a color filter layer 326a and a color filter layer 326b disposed on the dielectric layer 322. FIG. 8 illustrates the color filter layer 326a and the color filter layer 326b are separated from each other. In some examples, the color filter layer 326a and the color filter layer 326b may be partially overlapped. The color filter layer 326a and the color filter layer 326b may allow light with specific wavelength to pass through. For example, the color filter layer 326a and the color filter layer 326b may include, but are not limited to, a red color filter, a green color filter, a blue color filter or an IR color filter. The liquid crystal display 300 may include a conductive through hole 328. In some embodiments, the conductive through hole 328 may penetrate the color filter layer 326b and the dielectric layer 322. The conductive through hole 328 may include conductive material, such as metal or transparent conductive material (e.g. indium tin oxide). The conductive through hole 328 may be electrically connected to the first thin film transistor 310. The liquid crystal display 300 may include a planarization layer 332. The material of the planarization layer 332 may be the same as or similar to that of the dielectric layer 322.

As shown in FIG. 8, the liquid crystal display 300 may include a pixel electrode 330 and a common electrode 336. The pixel electrode 330 may be disposed on the color filter layer 326b, and the common electrode 336 may be disposed on the planarization layer 332. In other examples, the pixel electrode 330 may be disposed on the common electrode 336, or the pixel electrode 330 and the common electrode 336 may be disposed on the same layer, but the present disclosure is not limited thereto. The voltage difference between the pixel electrode 330 and the common electrode 336 may be controlled by the first thin film transistor 310 through the conductive through hole 328.

The liquid crystal display 300 may include an alignment layer 334. The alignment layer 334 may include, but is not limited to, polyimide. As shown in FIG. 8, the liquid crystal display 300 may include a spacer 339 disposed between the first substrate 302 and a second substrate 340. The material of the spacer 339 may be the same as or similar to that of the spacer 244.

As shown in FIG. 8, the liquid crystal display 300 may include the second substrate 340 that may be the same as or similar to the second substrate 122. The liquid crystal display 300 may include a buffer layer 342, a buffer layer 344 and a dielectric layer 346 that may be the same as or similar to the buffer layer 272, the buffer layer 274 and the dielectric layer 266, respectively. The liquid crystal display 300 may include a shielding layer 348 that may be the same as or similar to the shielding layer 126. The liquid crystal display 300 may include a second thin film transistor 350. The second thin film transistor 350 may include a gate electrode 352, a source 354, a drain 356 and a semiconductor layer 358 that may be the same as or similar to the gate electrode 136, the source 138, the drain 140 and the semiconductor layer 142, respectively. In some embodiments, the material(s) of the source 354 and the drain 356 may include metal.

The liquid crystal display 300 may include a sensing unit 364 that may be the same as or similar to the sensing unit 148. As shown in FIG. 8, the second thin film transistor 350 is electrically connected to the sensing unit 364 through the electrode 362. Though it is not depicted, two or more second thin film transistors 350 and sensing units 364 may be disposed on the second substrate 340, and the number of second thin film transistor 350 and/or sensing units 364 is not limited in the present disclosure. In some examples, a buffer layer (not shown) or a planarization layer (not shown) may be disposed between the sensing unit 364 and an alignment layer 368, but it is not limited thereto.

The liquid crystal display 300 may include a dielectric layer 366. The liquid crystal display 300 may include the alignment layer 368. As shown in FIG. 8, the alignment layer 334 and the alignment layer 368 are disposed on two opposite sides of the liquid crystal layer 338. The alignment layer 368 may include, but is not limited to, polyimide. The liquid crystal display 300 may include a sealant 370, which may be disposed in the peripheral region of the liquid crystal display 300.

In some embodiments, the distance $D_2$ between the first thin film transistor 310 and the color filter layer (e.g. the color filter layer 326b) overlapping with the first thin film transistor 310 along the normal direction of the first substrate 302 is less than the distance $D_3$ between the second thin film transistor 350 and the color filter layer (e.g. the color filter layer 326b) overlapping with the second thin film transistor 350 along the normal direction of the first substrate 302. More specifically, the minimum distance between the semiconductor layer 318 of the first thin film transistor 310 and the color filter layer along the normal direction of the first substrate 302 is less than the minimum distance between the semiconductor layer 358 of the second thin film transistor 350 and the color filter layer along the normal direction of the first substrate 302.

Referring to FIGS. 9A-9E, which illustrate cross-sectional views of different stages of a process for manufacturing a liquid crystal display 400A in accordance with some embodiments of the present disclosure. Note that the same or similar elements or layers corresponding to those of the liquid crystal display are denoted by like reference numerals. In some embodiments, the same or similar elements or layers denoted by like reference numerals have the same meaning and will not be repeated for the sake of brevity.

Figure 9A:
FIGS. 9A-9E illustrate cross-sectional views of different stages of a process for manufacturing the liquid crystal display in accordance with some embodiments of the present disclosure.
Figure 9B:
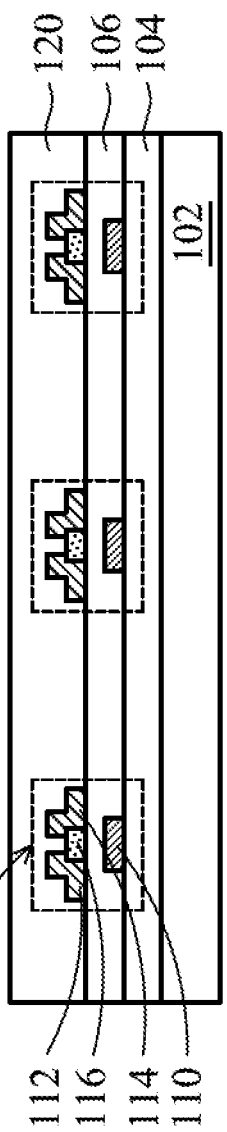
Figure 9C:
Figure 9D:
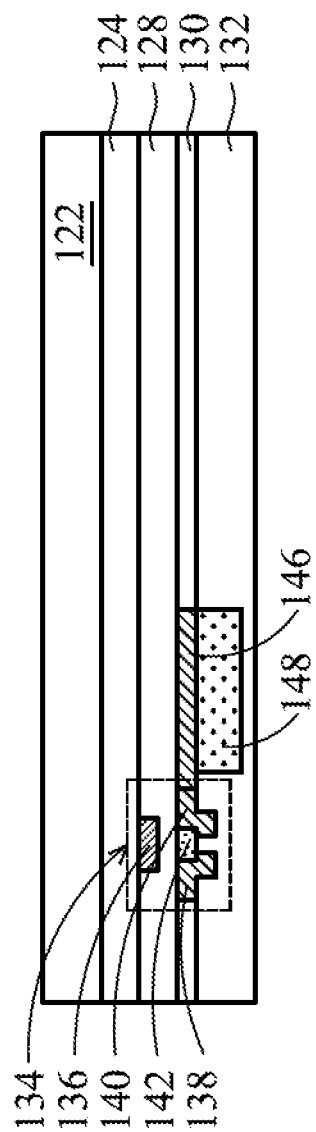
Figure 9E:
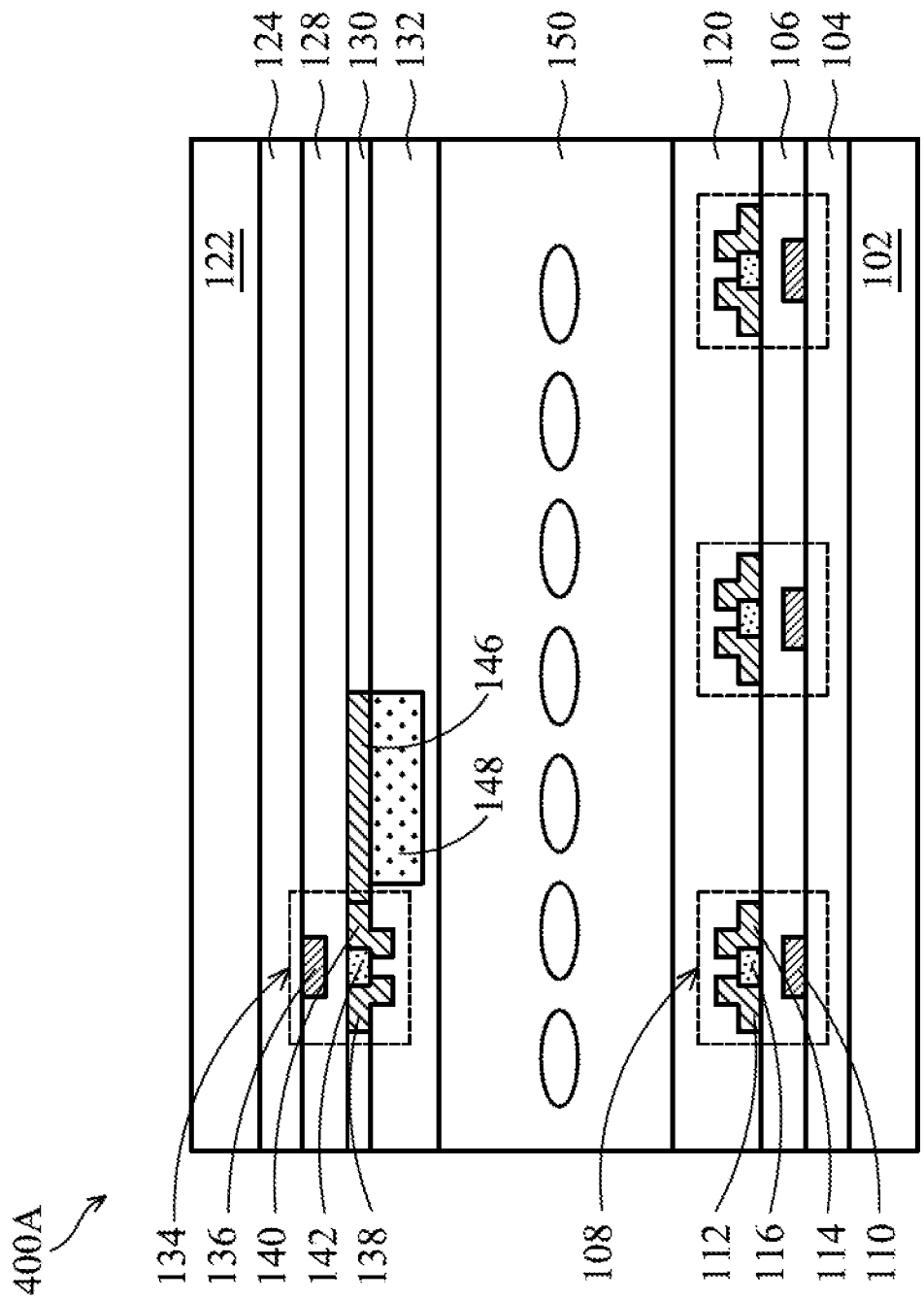

As shown in FIG. 9A, the first substrate 102 is provided. Next, the first thin film transistor 108 may be formed on the first substrate 102 as shown in FIG. 9B. The buffer layer 104, the gate dielectric layer 106, and the dielectric layer 120 may also be formed on the first substrate 102. Next, the second substrate 122 is provided as shown in FIG. 9C. In some embodiments, as shown in FIG. 9D, the second thin film transistor 134 and the sensing unit 148 are formed on the second substrate 122 in accordance with some embodiments. As shown in FIG. 9E, the first substrate 102 and the second substrate 122 are combined, and the liquid crystal layer 150 is formed between the first substrate 102 and the second substrate 122. It should be appreciated that manufacturing the liquid crystal display 400A may include forming other elements. For example, some shielding layers may be formed on the first substrate 102 and/or on the second substrate 122. Some color filter layers may be formed on the first substrate 102 or the second substrate 122. Moreover, the stages of FIGS. 9A and 9B may be performed before, after, or during the stages of FIGS. 9C and 9D.

Referring to FIGS. 10A-10E, which illustrate cross-sectional views of different stages of a process for manufacturing a liquid crystal display 400B in accordance with some embodiments of the present disclosure.

Figure 10E:
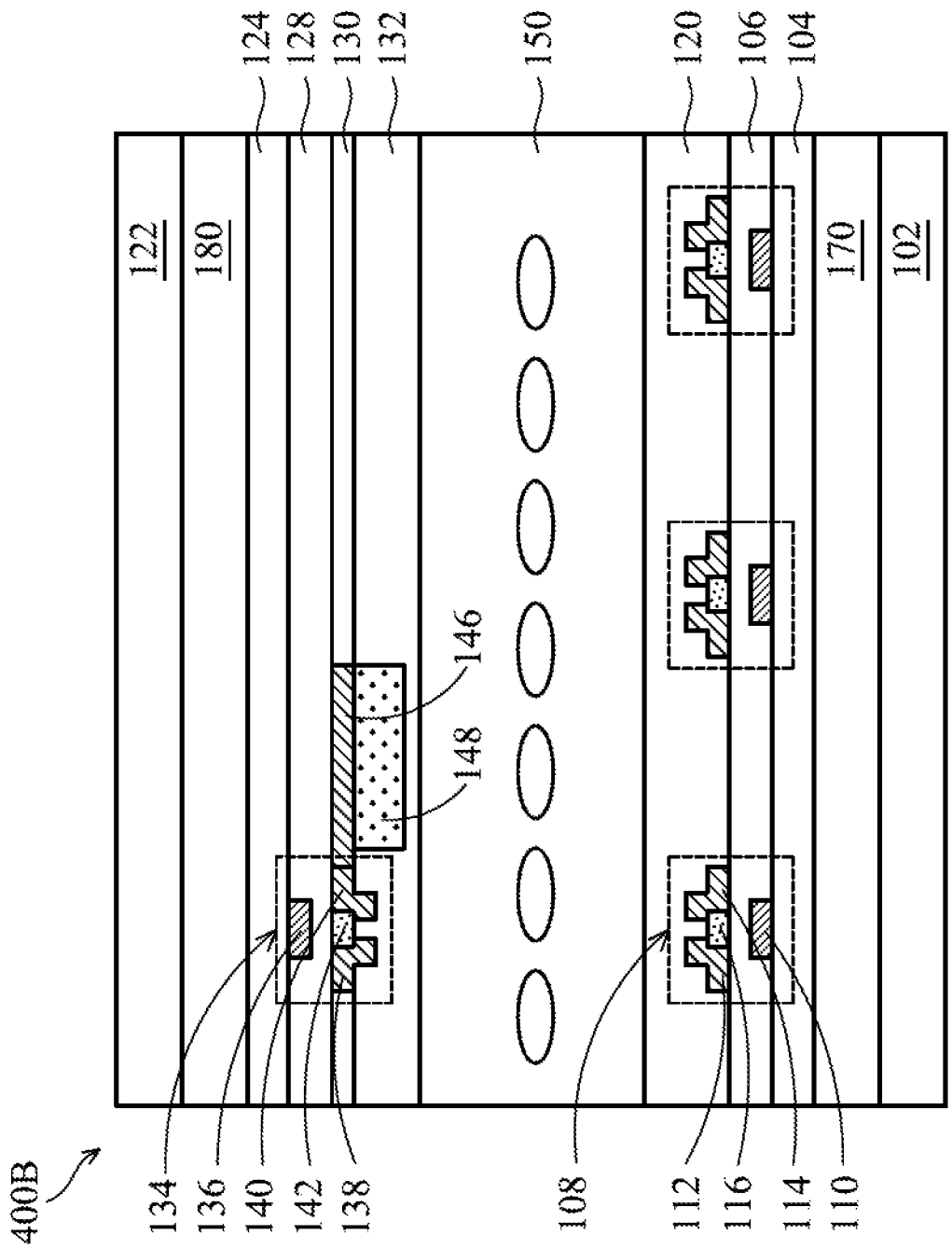

As shown in FIG. 10A, the first substrate 102 is provided, and a first flexible substrate 170 may be attached to or formed on the first substrate 102. Next, the first thin film transistor 108 may be formed on the first flexible substrate 170 as shown in FIG. 10B. The buffer layer 104, the gate dielectric layer 106, and the dielectric layer 120 may also be formed on the first flexible substrate 170. In some embodiments, the first flexible substrate 170 is disposed between the first substrate 102 and the first thin film transistor 108. Next, the second substrate 122 is provided, and a second flexible substrate 180 may be attached to or formed on the second substrate 122 as shown in FIG. 10C. In some embodiments, as shown in FIG. 10D, the second thin film transistor 134 and the sensing unit 148 are formed on the second flexible substrate 180 in accordance with some embodiments. In some embodiments, the second flexible substrate 180 is disposed between the second substrate 122 and the second thin film transistor 134. As shown in FIG. 10E, the first substrate 102 and the second substrate 122 are combined, and the liquid crystal layer 150 is formed between the first substrate 102 and the second substrate 122. In some embodiments, the first flexible substrate 170 and the second flexible substrate 180 are formed between the first substrate 102 and the second substrate 122. It should be appreciated that manufacturing the liquid crystal display 400B may include forming other elements. For example, some shielding layers may be formed on the first substrate 102 and/or on the second substrate 122. Some color filter layers may be formed on the first substrate 102 or the second substrate 122.

Moreover, the stages of FIGS. 10A and 10B may be performed before, after, or during the stages of FIGS. 10C and 10D.

Referring to FIGS. 11A-11E, which illustrate cross-sectional views of different stages of a process for manufacturing a liquid crystal display 400C in accordance with some embodiments of the present disclosure.

Figure 11A:
FIGS. 11A-11E illustrate cross-sectional views of different stages of a process for manufacturing the liquid crystal display in accordance with some embodiments of the present disclosure.
Figure 11B:
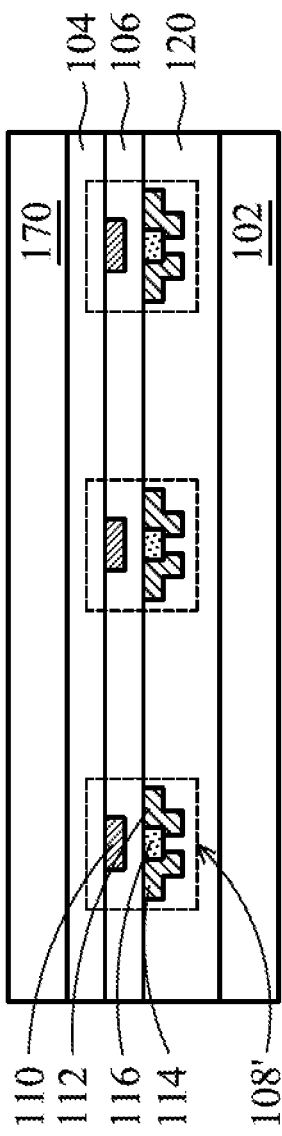

As shown in FIG. 11A, the first substrate 102 is provided. Next, the first thin film transistor 108' may be formed on the first substrate 102 as shown in FIG. 10B. The buffer layer 104, the gate dielectric layer 106, and the dielectric layer 120 may also be formed on the first substrate 102. In some embodiments, the first flexible substrate 170 is formed on the first thin film transistor 108', and the first thin film transistor 108' would be disposed between the first substrate 102 and the first flexible substrate 170. The difference between the first thin film transistor 108' and the first thin film transistor 108 is the position of the gate electrode 110. In other embodiments, the first thin film transistor 108' and the first thin film transistor 108 may be the same type of thin film transistor. For example, the first thin film transistor 108' and the first thin film transistor 108 both are top gate thin film transistors or bottom gate thin film transistors, but it is not limited thereto. The first thin film transistor 108 and the first thin film transistor 108' may perform the same function.

Figure 11C:
Figure 11D:
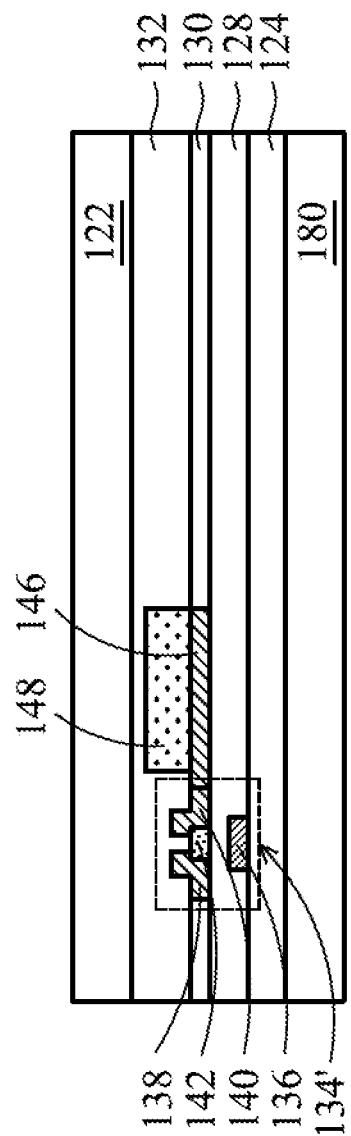

Next, the second substrate 122 is provided as shown in FIG. 11C. In some embodiments, as shown in FIG. 11D, the second thin film transistor 134' and the sensing unit 148 are formed on the second substrate 122. In some embodiments, the second flexible substrate 180 is formed on the second thin film transistor 134'. The second thin film transistor 134' may be disposed between the second substrate 122 and the second flexible substrate 180. The difference between the second thin film transistor 134' and the second thin film transistor 134 is the position of the gate electrode 136. The second thin film transistor 134 and the second thin film transistor 134' may perform the same function. In other embodiments, the second thin film transistor 134' and the second thin film transistor 134 may be the same type of thin film transistor. For example, the second thin film transistor 134' and the second thin film transistor 134 both are top gate thin film transistors or bottom gate thin film transistors, but it is not limited thereto. Moreover, the stages of FIGS. 11A and 11B may be performed before, after, or during the stages of FIGS. 11C and 11D.

Figure 11E:
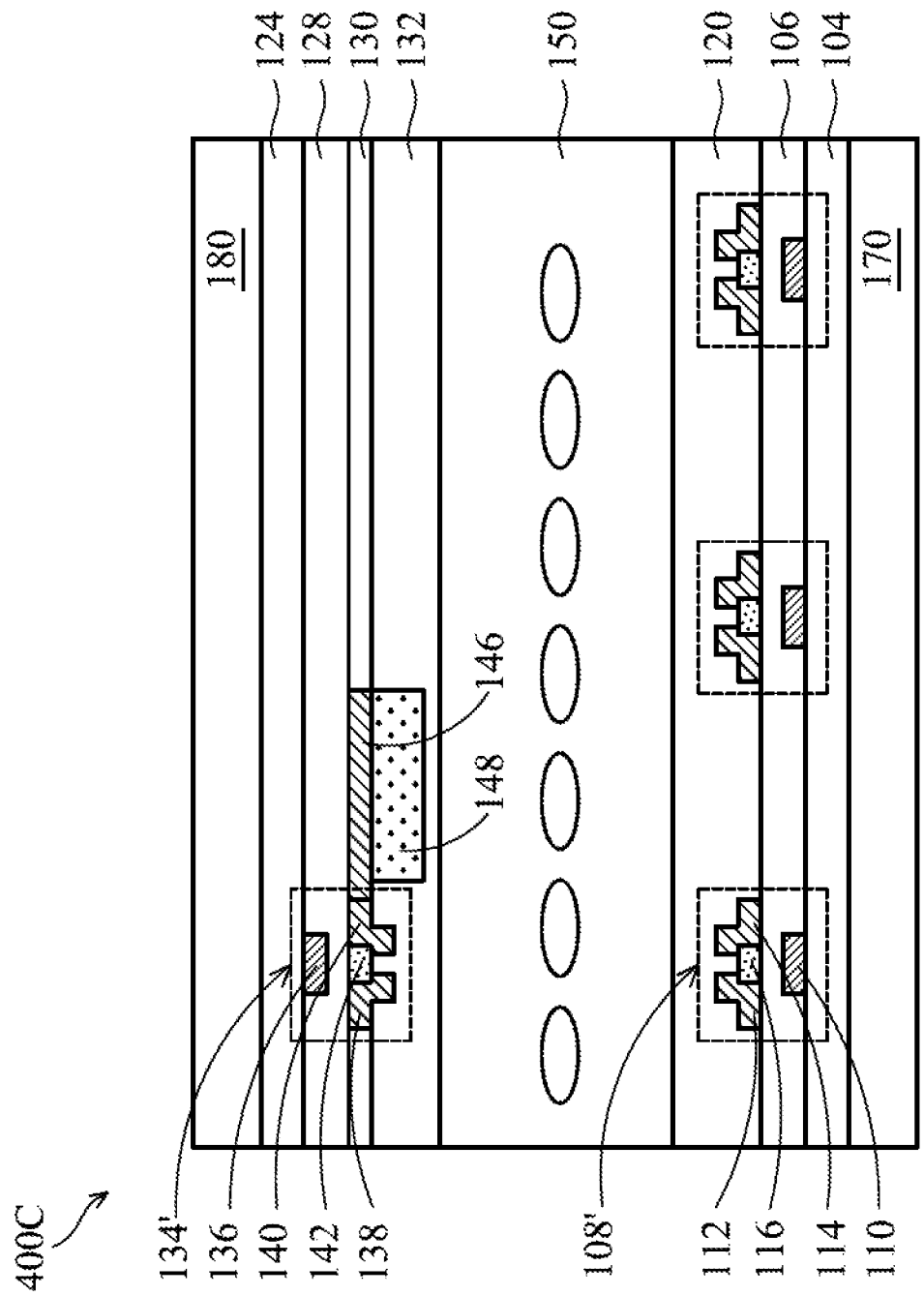

As shown in FIG. 11E, the first flexible substrate 170 and the second flexible substrate 180 are combined, and the first substrate 102 and the second substrate 122 may be removed. In some embodiments, the first thin film transistor 108' and the second thin film transistor 134' are formed between the first flexible substrate 170 and the second flexible substrate 180.

Refer to FIG. 12, a liquid crystal display 500 is provided. In some embodiment, the liquid crystal display 500 may include a flexible liquid crystal display, a touch liquid crystal display, a curved liquid crystal display, a tiled display or other suitable displays. For example, the liquid crystal display 500 is a curved liquid crystal display. When the liquid crystal display 500 is bended to form a curved liquid crystal display, the alignment of some of the components (e.g. the color filter layer or the shielding layer) of the liquid crystal display 500 may be shifted. Therefore, some of the components (e.g. the color filter layer and/or the shielding layer (not shown)) disposed on the second substrate 122 originally may be moved to be disposed on the first substrate 102 to reduce the shift. The space of the second substrate 122 may be sufficient to dispose sensing unit 148' and the second thin film transistor 134.

Although some embodiments of the present disclosure and their advantages have been described in detail, it should be understood that various changes, substitutions and alterations can be made herein without departing from the spirit and scope of the disclosure as defined by the appended claims.

What is claimed is:

1. A display device, comprising:
   a first substrate;
   a plurality of first thin film transistors disposed on the first substrate;
   a second substrate disposed opposite to the first substrate;
   a plurality of second thin film transistors disposed on the second substrate;
   a plurality of sensing units disposed on the second substrate;
   a first shielding layer disposed between at least one of the plurality of sensing units and the first substrate, wherein at least one of the plurality of first thin film transistors comprises a first semiconductor layer, and the first shielding layer overlaps with the first semiconductor layer; and
   a second shielding layer disposed between the first shielding layer and the at least one of the plurality of sensing units, wherein at least one of the plurality of second thin film transistors comprises a second semiconductor layer, and the second semiconductor layer overlaps with the second shielding layer,
   wherein the first semiconductor layer comprises a first channel, the second semiconductor layer comprises a second channel, and a width-to-length ratio of the first channel is different from a width-to-length ratio of the second channel,
   wherein the first shielding layer comprises a plurality of first openings, the second shielding layer comprises a plurality of second openings, and each of the sensing units overlaps at least one of the plurality of first openings and at least one of the plurality of second openings.

2. The display device according to claim 1, wherein at least one of the plurality of second thin film transistors at least partially overlaps with at least one of the plurality of first thin film transistors in a top view direction of the display device.

3. The display device according to claim 1, wherein the first shielding layer is disposed between the second substrate and at least one of the plurality of first thin film transistors.

4. The display device according to claim 1, further comprising a third shielding layer disposed between the second substrate and at least one of the plurality of second thin film transistors.

5. The display device according to claim 1, wherein a distance between a semiconductor layer of at least one of the plurality of first thin film transistors and a semiconductor layer of at least one of the plurality of second thin film transistors is in a range between 0.5 μm and 10 μm.

6. The display device according to claim 1, wherein a material of the first semiconductor layer is different from a material of the second semiconductor layer.

7. The display device according to claim 1, wherein at least one of the plurality of sensing units extends across at least two of the plurality of first thin film transistors.

8. A method for manufacturing a display device, comprising:
   providing a first substrate;

forming a plurality of first thin film transistors on the first substrate;

providing a second substrate;

forming a plurality of second thin film transistors on the second substrate;

forming a plurality of sensing units on the second substrate;

forming a first shielding layer between at least one of the plurality of sensing units and the first substrate, wherein at least one of the plurality of first thin film transistors comprises a first semiconductor layer, and the first shielding layer overlaps with the first semiconductor layer;

forming a second shielding layer between the first shielding layer and the at least one of the plurality of sensing units, wherein at least one of the plurality of second thin film transistors comprises a second semiconductor layer, and the second semiconductor layer overlaps with the second shielding layer, wherein the first semiconductor layer comprises a first channel, the second semiconductor layer comprises a second channel, and a width-to-length ratio of the first channel is different from a width-to-length ratio of the second channel, wherein the first shielding layer comprises a plurality of first openings, the second shielding layer comprises a plurality of second openings, and each of the sensing units overlaps at least one of the plurality of first openings and at least one of the plurality of second openings; and combining the first substrate and the second substrate.

9. The method according to claim 8, further comprising:

providing a first flexible substrate on the first substrate, the plurality of first thin film transistors being disposed between the first flexible substrate and the first substrate; and providing a second flexible substrate on the second substrate, the plurality of second thin film transistors being disposed between the second flexible substrate and the second substrate.

10. The method according to claim 8, wherein the first shielding layer is disposed between the second substrate and at least one of the plurality of first thin film transistors.

* * * * *